United States Patent
Onuki (10) Patent No.: US 11,808,561 B2
(45) Date of Patent: Nov. 7, 2023

(54) ELECTRONIC APPARATUS FOR CONTROLLING A PROJECTOR TO PROJECT AN IMAGE ONTO A SCREEN AT AN ACTUAL SIZE LENGTH, CONTROL METHOD THEREOF AND COMPUTER READABLE STORAGE MEDIUM

(71) Applicant: CANON KABUSHIKI KAISHA, Tokyo (JP)

(72) Inventor: Kenji Onuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 17/531,889

(22) Filed: Nov. 22, 2021

(65) Prior Publication Data

US 2022/0082370 A1 Mar. 17, 2022

Related U.S. Application Data (63) Continuation of application No. 15/930,868, filed on May 13, 2020, now Pat. No. 11,209,262.

(30) Foreign Application Priority Data

May 16, 2019 (JP) .................... 2019-093132

(51) Int. Cl.
| | |
|---|---|
| *G01B 11/02* | (2006.01) |
| *G03B 21/53* | (2006.01) |
| *G01B 11/25* | (2006.01) |
| *G01S 15/46* | (2006.01) |
| *G01S 17/46* | (2006.01) |

(52) U.S. Cl.
CPC ............ *G01B 11/026* (2013.01); *G01B 11/25* (2013.01); *G01S 15/46* (2013.01); *G01S 17/46* (2013.01); *G03B 21/53* (2013.01)

(58) Field of Classification Search
CPC ....... G01B 11/026; G01B 11/25; G01S 15/46; G01S 17/46; G01S 17/08; G03B 21/53; H04N 9/3179; H04N 9/3194; H04N 13/239
See application file for complete search history.

(56) References Cited

U.S. PATENT DOCUMENTS

| | | | |
|---|---|---|---|
| 4,152,767 A | 5/1979 | Laliotis | |
| 6,522,394 B2 | 2/2003 | Ichimiya | |
| 7,423,658 B1 * | 9/2008 | Uomori | ........... G06T 7/586 |
| | | | 345/660 |

(Continued)

FOREIGN PATENT DOCUMENTS

| | | | | |
|---|---|---|---|---|
| CN | 101872108 A | * | 10/2010 | ............ G03B 21/26 |
| JP | 2001-209827 A | | 8/2001 | |

(Continued)

*Primary Examiner* — Roy M Punnoose
(74) *Attorney, Agent, or Firm* — Cowan, Liebowitz & Latman, P.C.

(57) ABSTRACT

An electronic apparatus, comprises a projection unit configured to project an image, a measurement unit configured to measure a distance to an object, a projection control unit configured to control, based on the distance to the object measured by the measurement unit, projection of the image by the projection unit so that the image projected onto the object has a preliminarily set actual size length.

24 Claims, 10 Drawing Sheets

(56) References Cited

U.S. PATENT DOCUMENTS

| | | | | |
|---|---|---|---|---|
| 8,654,153 | B2* | 2/2014 | Okamoto | G03B 21/26 |
| | | | | 345/660 |
| 9,557,160 | B2 | 1/2017 | Kang et al. | |
| 11,209,262 | B2* | 12/2021 | Onuki | H04N 13/239 |
| 2002/0048011 | A1 | 4/2002 | Ichimiya | |
| 2011/0221781 | A1* | 9/2011 | Okamoto | G01B 11/026 |
| | | | | 345/660 |
| 2016/0040981 | A1 | 2/2016 | Kang et al. | |
| 2022/0229352 | A1* | 7/2022 | Yue | H04N 9/3173 |

FOREIGN PATENT DOCUMENTS

| | | | |
|---|---|---|---|
| JP | 2005-236878 A | 9/2005 | |
| JP | 2007-205915 A | 8/2007 | |
| JP | 2010-112875 A | 5/2010 | |
| JP | 2013-092536 A | 5/2013 | |
| JP | 2015-091008 A | 5/2015 | |
| JP | 2018-155709 A | 10/2018 | |
| WO | WO-2017124617 A1 * | 7/2017 | G03B 21/142 |
| WO | 2018/164172 A | 9/2018 | |

* cited by examiner

ELECTRONIC APPARATUS FOR CONTROLLING A PROJECTOR TO PROJECT AN IMAGE ONTO A SCREEN AT AN ACTUAL SIZE LENGTH, CONTROL METHOD THEREOF AND COMPUTER READABLE STORAGE MEDIUM

CROSS-REFERENCE TO RELATED APPLICATION

This application is a continuation of application Ser. No. 15/930,868, filed May 13, 2020, the entire disclosure of which is hereby incorporated by reference.

BACKGROUND OF THE INVENTION

Field of the Invention

The present invention relates to an electronic apparatus, and a control method thereof and a computer readable storage medium.

Description of the Related Art

Generally, there are known stereo cameras that use two image capture units to capture images having parallax. Such a stereo camera captures an image of one subject by two image capture units simultaneously, and obtains two types of images with parallax, namely a first image and a second image. It is possible to calculate the length in the depth direction of the subject from the two types of images captured by the stereo camera.

Japanese Patent Laid-Open No. 2001-209827 discloses a technique for measuring the length between two points specified on a subject by a user in a three-dimensional space, using an image capture device that can capture parallax images. Japanese Patent Laid-Open No. 2001-209827 describes generating, based on three-dimensional positional information of a subject specified by a user on a captured image displayed on a display panel, a scale image representing substantially the actual size of the subject, synthesizing the generated scale image with the captured image, and displaying the synthesized image.

According to Japanese Patent Laid-Open No. 2001-209827, a scale image whose actual size can be measured is displayed in a superimposed manner at an arbitrary position on a display screen, whereby the user can measure the length of the subject. However, the scale image is displayed on the display screen, and therefore a non-photographer (e.g., a user located near the subject) who is not viewing the display screen cannot confirm the measurement result. In other words, the user cannot grasp the length of an object, the positional relation (distance) with surrounding objects while viewing the subject directly by eyesight (without viewing the display screen).

SUMMARY OF THE INVENTION

The present invention provides a technique that allows a user to view an object directly by eyesight to grasp the length of the object.

According to one aspect of the present invention, there is provided an electronic apparatus, comprising: a projection unit configured to project an image; at least one memory storing a program; and one or more processors which, by executing the program, function as: a measurement unit configured to measure a distance to an object; and a projection control unit configured to control, based on the distance to the object measured by the measurement unit, projection of the image by the projection unit so that the image projected onto the object has a preliminarily set actual size length.

According to another aspect of the present invention, there is provided a method of controlling an electronic apparatus comprising a projection unit configured to project an image and a measurement unit configured to measure a distance to an object, the method comprising: measuring a distance to the object by the measurement unit; and controlling projection by the projection unit so that the image projected onto the object has a preliminarily set actual size length, based on the measured distance to the object.

According to another aspect of the present invention, there is provided a non-transitory computer-readable storage medium storing a program that causes a computer of an electronic apparatus comprising a projection unit configured to project an image and a measurement unit configured to measure a distance to an object to perform a control method comprising: measuring a distance to the object by the measurement unit; and controlling projection by the projection unit so that the image projected onto the object has a preliminarily set actual size length, based on the measured distance to the object.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1A:
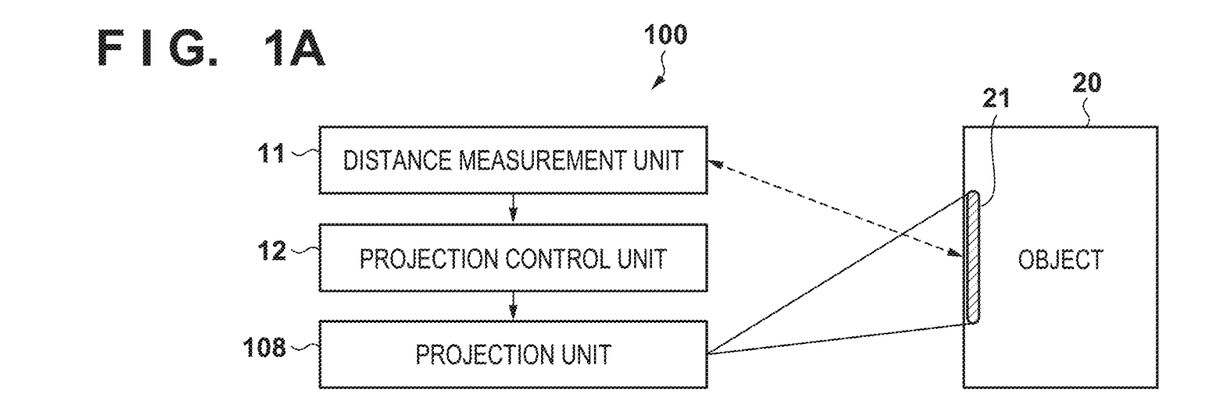
FIG. 1A is a block diagram illustrating exemplary functional configuration of an electronic apparatus according to an embodiment.

FIG. 1A is a block diagram illustrating a major functional configuration of an electronic apparatus 100 of a first embodiment. The electronic apparatus 100 having a projection unit 108 that projects an image includes a distance measurement unit 11 and a projection control unit 12 as a functional configuration. The distance measurement unit 11 measures the distance to an object 20. The projection control unit 12 controls projection of images by the projection unit 108 so that an image 21 projected on the object 20 has a predetermined actual size length, based on the distance to the object 20 measured by the distance measurement unit 11. In the following, exemplary configuration that implements the distance measurement unit 11 and the projection control unit 12 will be described in detail.

The first embodiment describes a configuration for measuring the distance to and the length of an object (hereinafter, subject) whose image has been captured using an image capture device such as a digital camera, and using the result to project an image of a predetermined actual size length onto the subject as an image of the predetermined actual size length. In the following, although an image capture device having a projection function (e.g., a form in which a projection unit is mounted to an accessory shoe of a digital camera) is described as an example of the electronic apparatus 100, the electronic apparatus of the present embodiment is not limited to such an image capture device. For example, the electronic apparatus may be a projection device having an image capture unit, or a personal computer (PC) having an image capture device and a projection device connected thereto.

Figure 1B:
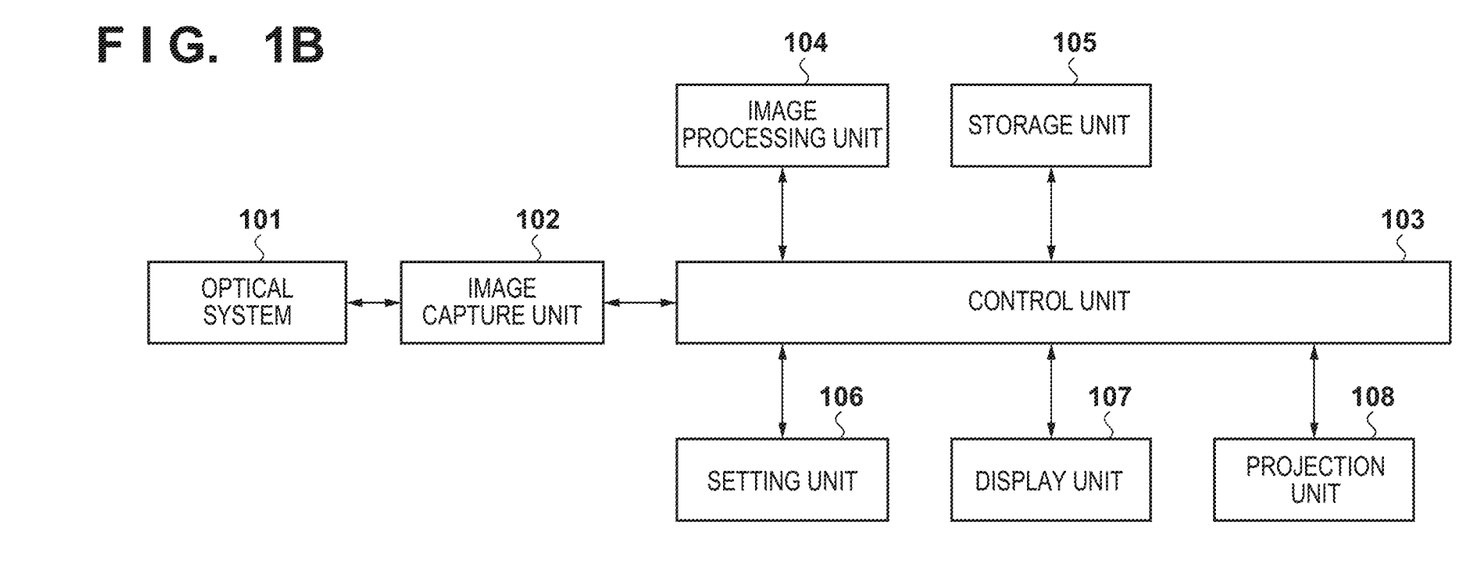
FIG. 1B is a block diagram illustrating exemplary hardware configuration of the electronic apparatus.

FIG. 1B is a block diagram illustrating exemplary hardware configuration of the electronic apparatus 100 according to the first embodiment. In FIG. 1B, an optical system 101 includes a lens group including a zoom lens and a focus lens, an aperture adjustment device, and a shutter device. The optical system 101 adjusts the scaling factor, focus position, or light amount of a subject image reaching an image capture unit 102. The image capture unit 102 includes a photoelectric conversion element such as a CCD or a CMOS sensor that photoelectrically converts a light flux of the subject having passed through the optical system 101 into an electrical signal, and an A/D conversion unit configured to convert the input image signal into a digital image.

A control unit 103, including one or more processors (CPU) and a memory, for example, controls various operations in the electronic apparatus 100 by executing, by the one or more processors, predetermined programs stored in the memory. For example, the control unit 103 calculates an exposure amount for image capturing to obtain an input image having an appropriate brightness, and controls the optical system 101 (aperture, shutter speed, etc.) and the image capture unit 102 (analog gain of a sensor) in order to realize the exposure amount. An image processing unit 104 performs, besides normal image processing, a process of calculating various feature amounts from the image of the subject. The image processing unit 104 can perform similar image processing not only on images output from the control unit 103, but also on images read from a storage unit 105.

Note that a part or all of the functions of the image processing unit 104 may be realized by the control unit 103.

The storage unit 105 has a function of storing temporary data used in various processes, storing images, or the like. The storage unit 109 may include an information recording medium using, for example, a Dynamic Random Access Memory (DRAM), a memory card having a semiconductor memory mounted therein, a package containing a rotational recording medium such as a magneto-optical disk, or the like.

A setting unit 106 has a function of obtaining various values arbitrarily set by a user when performing image capture and measurement. A display unit 107 functions as an electronic view finder (EVF) by sequentially displaying images output from the image processing unit 104 on a display member such as an LCD. The projection unit 108 projects an image while enlarging or reducing the image to an arbitrary size, or projects a light beam having an arbitrary length or color.

Figure 2A:
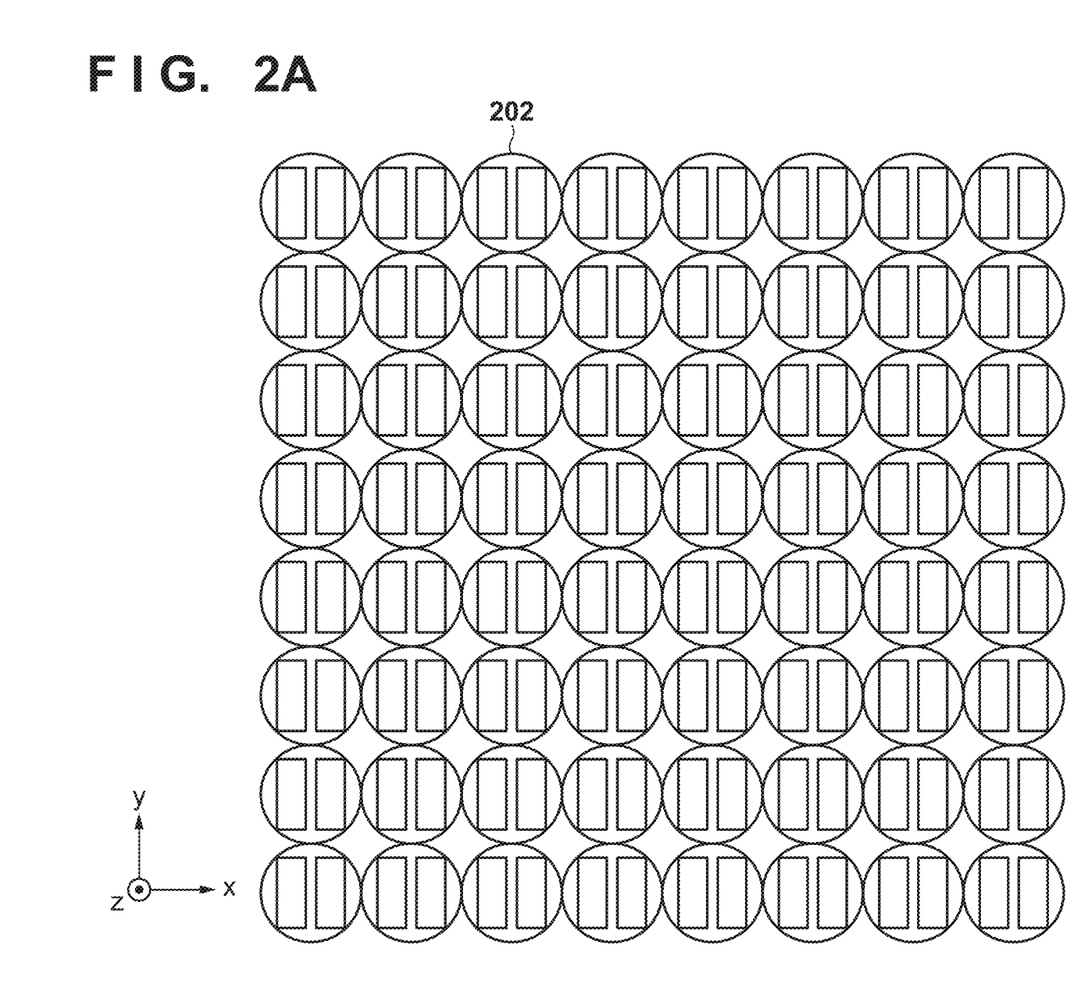
FIGS. 2A and 2B are block diagrams illustrating exemplary configurations of an image capture unit according to the embodiment.
Figure 2B:
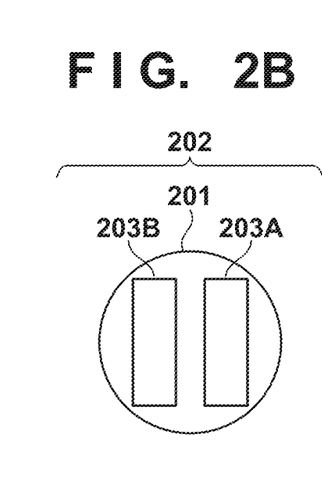

FIG. 2A illustrates a part of an array of pixels 202 in the image capture unit 102. FIG. 2B illustrates an enlarged view of one of the pixels 202. In the image capture unit 102, the pixels 202 are arranged regularly and two-dimensionally. The pixel 202 is a so-called dual pixel image capture element having a micro lens 201 and a pair of photoelectric conversion units 203A and 203B.

Figure 3:
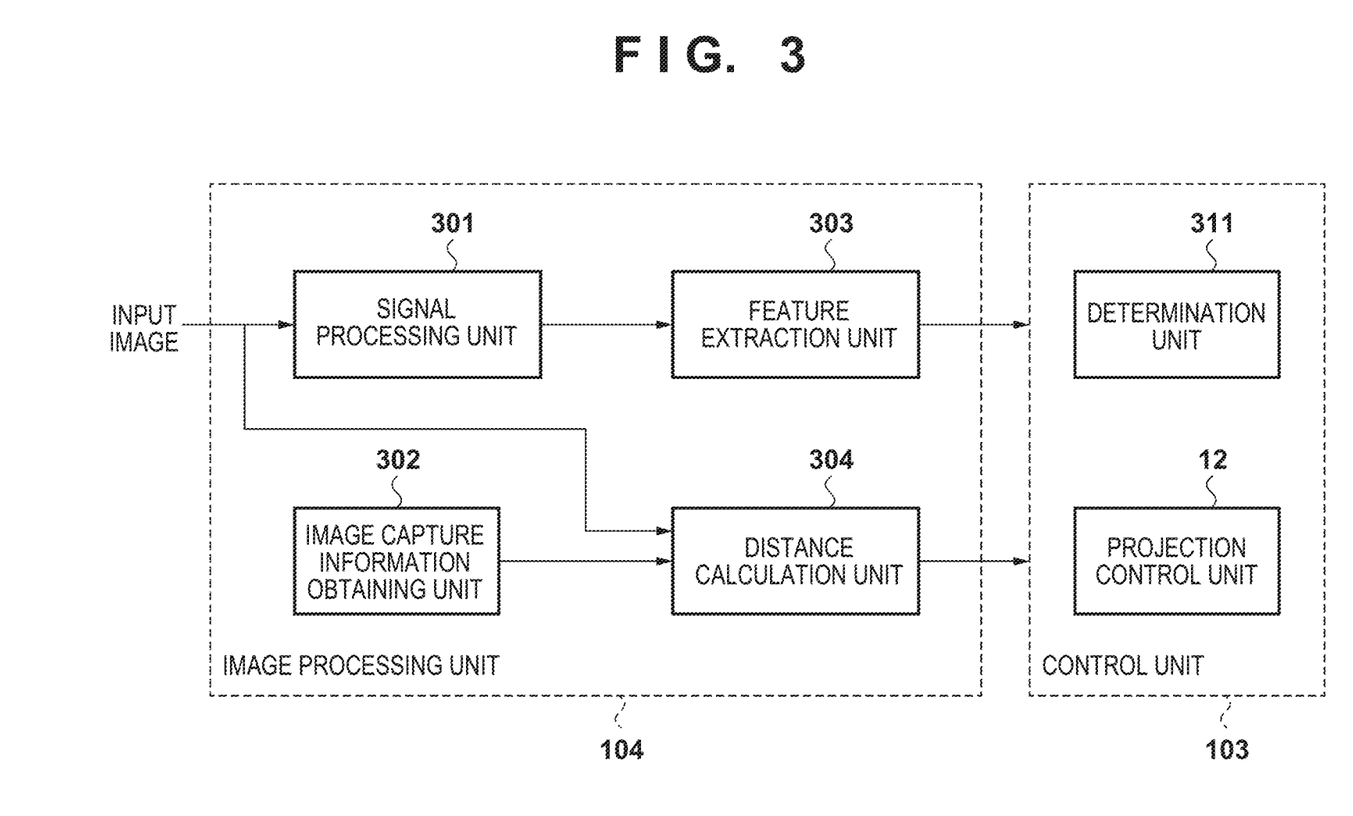
FIG. 3 is a block diagram illustrating an exemplary functional configuration of an image processing unit according to the embodiment.

FIG. 3 is a block diagram illustrating exemplary functional configuration of the control unit 103 and the image processing unit 104. In FIG. 3, a signal processing unit 301 performs normal signal processing such as a noise reduction process, a development process, or the like. In addition, the signal processing unit 301 performs a process of compressing the tonality of an image to be processed to a predetermined output range, using a tonality compression process based on gamma conversion. An image capture information obtaining unit 302 obtains various information such as image capture mode, focal length, aperture value, exposure time, which are set by the user when performing image capture.

A feature extraction unit 303 calculates various feature amounts such as brightness, color, edge, or the like, from the image output from the signal processing unit 301. A distance calculation unit 304 generates distance data indicating a distribution of distances from the electronic apparatus 100 to the subject in the captured image, based on a phase difference between a plurality of subject images appearing in a light flux coming from different regions of the pupil of the optical system 101. The image capture unit 102 and the distance calculation unit 304 are exemplary configurations that implement the aforementioned distance measurement unit 11. Here, the form of distance data calculated by the distance calculation unit 304 is not limited to the distance to the subject, and may take the form of distribution representing image shift amounts of a plurality of subject images obtained based on phase difference, or may take the form of distribution of defocus amounts obtained by converting the image shift amounts into the defocus amounts based on the K-value.

A determination unit 311 performs various determination processes using outputs from the feature extraction unit 303 and the distance calculation unit 304. The projection control unit 12, which is a component illustrated in FIG. 1A, controls projection of images by the projection unit 108 based on the distance calculated by the distance calculation unit 304. In addition, the projection control unit 12 controls the projection form (projection color, brightness, etc.) of an image, and whether or not to perform projection of the image by the projection unit 108, or the like, based on the feature of the image extracted by the feature extraction unit 303 and the distance calculated by the distance calculation unit 304.

Figure 4:
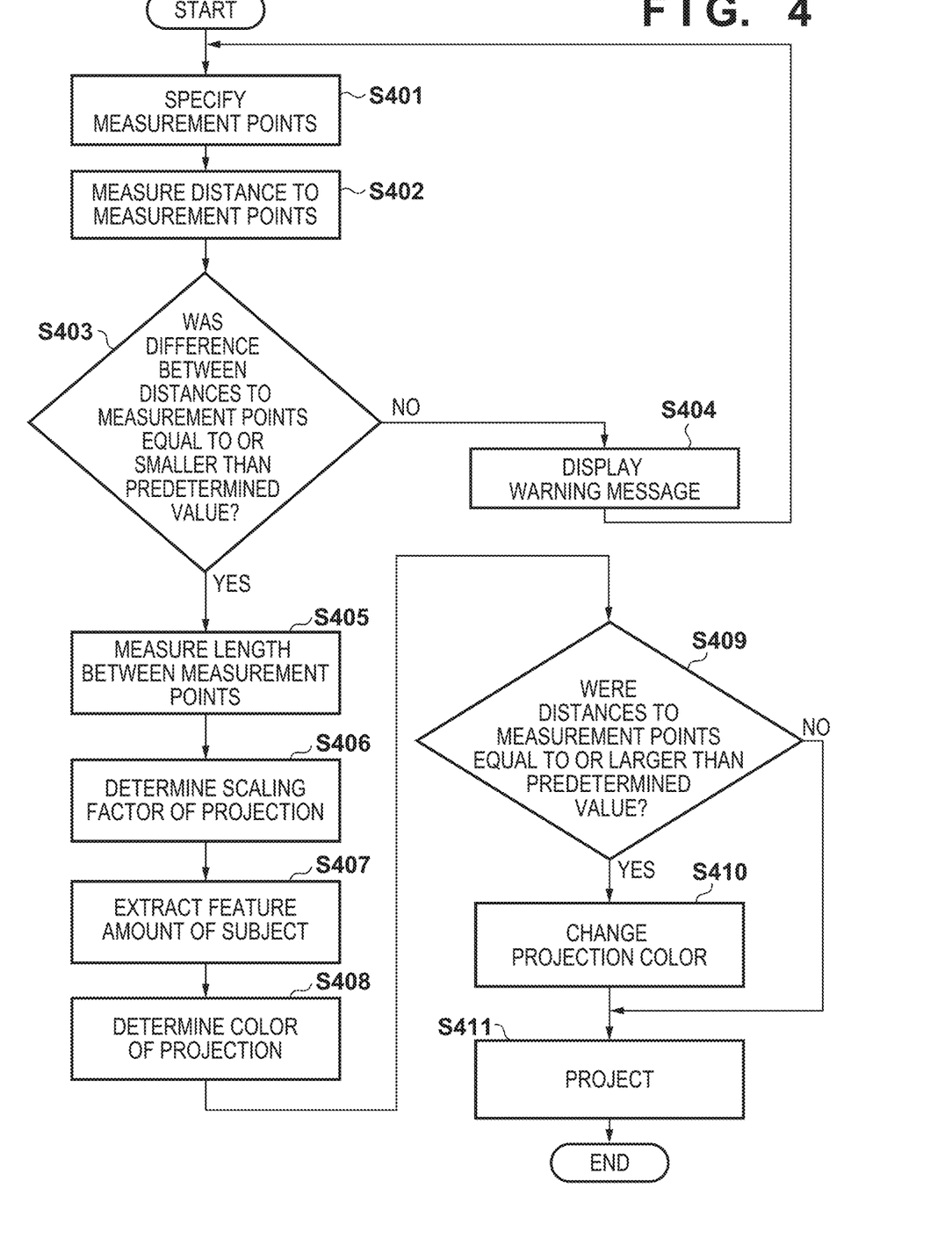
FIG. 4 is a flowchart illustrating an operation of the electronic apparatus according to the embodiment.
Figure 5:
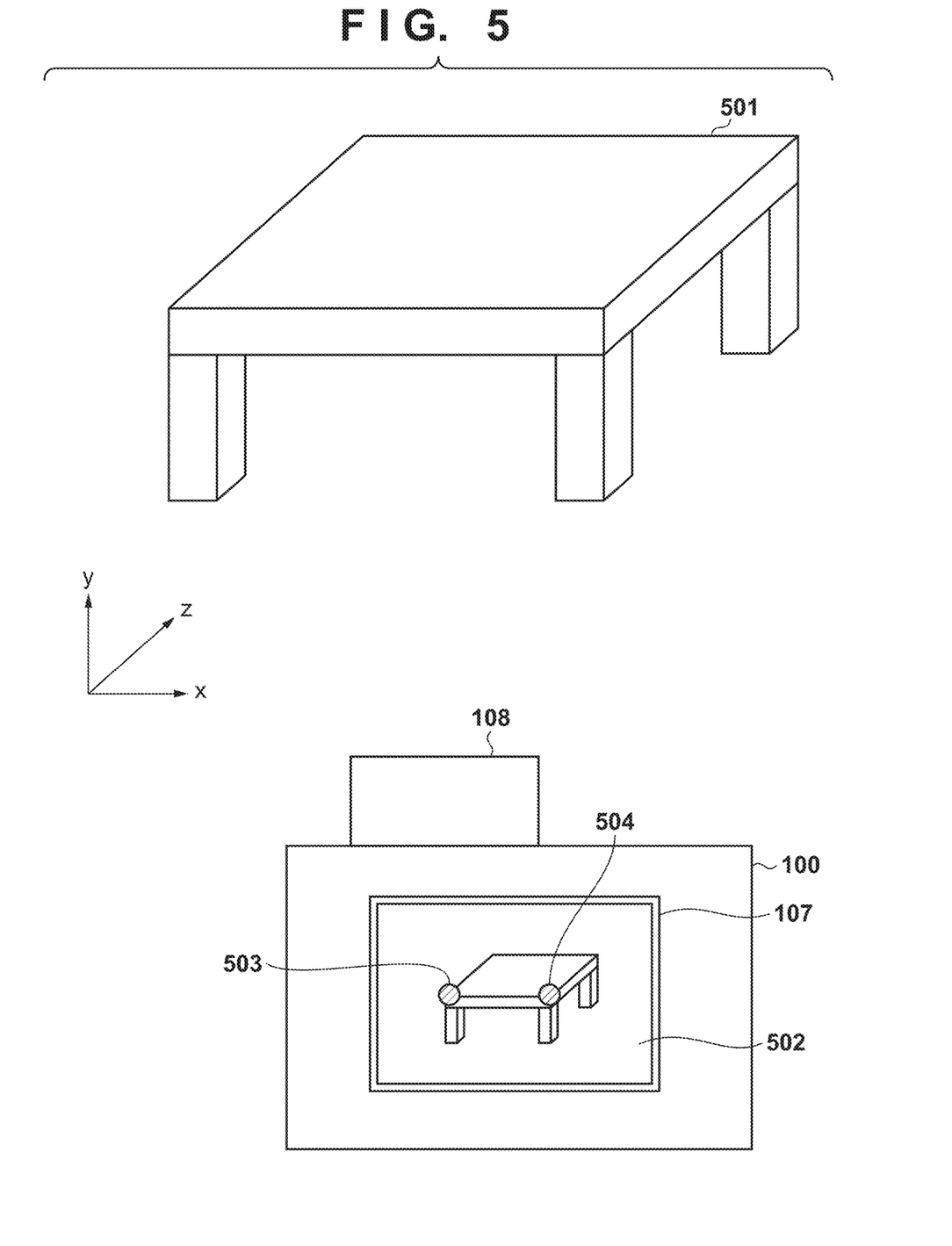
FIG. 5 illustrates an example of image capture and display state of a subject by the electronic apparatus according to the embodiment.

In the following, a projection control process of measuring the actual size length of a subject specified by a user on the display unit 107 of the electronic apparatus 100, and projecting a scale image onto the actual object using the result will be described, referring to the flowchart of FIG. 4. Note that FIG. 5 illustrates the electronic apparatus 100 capturing an image of a subject 501 whose length is desired to be measured by a user (not illustrated). In FIG. 5, an image 502 depicts an image displayed on the display unit 107.

At step S401, the control unit 103 receives, from the setting unit 106, a user-specified points, the length between which is to be measured. For example, measurement points are specified by the user arbitrarily touching two points on an image being displayed on the display unit 107. FIG. 5 illustrates that a user has specified a measurement point 503 and a measurement point 504 on the image 502 displayed on the display unit 107 of the electronic apparatus 100.

At step S402, the distance calculation unit 304 calculates respective distances to the two measurement points specified at step S401. The configuration of the image capture elements illustrated in FIGS. 2A and 2B causes two light fluxes having passed through different pupil regions in the optical system 101 to be incident on the photoelectric conversion unit 203A and the photoelectric conversion unit 203B. The brightness images obtained respectively by the photoelectric conversion unit 203A and the photoelectric conversion unit 203B have different pupil regions and therefore have parallax depending on the object distance position. Accordingly, a defocus amount can be calculated from the brightness images by known techniques such as stereo matching, or the like.

It is possible to convert a defocus amount into a distance value using the image formation formula of the optical system. The image distance from the rear principal point position of the optical system 101 to the image capture surface is denoted by S(0) for an in-focus object and S(0)+def1 for an out-of-focus object. Here, def1 is assumed to be the defocus amount calculated. The distance from the front principal point position of the optical system 101 to an in-focus object is denoted by OBJ(0) and the distance to an out-of-focus object is denoted by OBJ(def1). Accordingly, the following equation (1) holds for an in-focus object using the focal length f of the lens of the optical system 101.

$$1/OBJ(0)+1/S(0)=1/f \quad (1)$$

According to equation (1), it is possible to calculate the distance OBJ(0) to the object using S(0) and f, which are known values. In addition, the following equation (2) similarly holds for the distance OBJ(def1) to an out-of-focus object.

$$1/OBJ(def1)+1/(S(0)+def1)=1/f \quad (2)$$

In equation (2), it is possible to calculate the OBJ(def1) using the known value S(0) and the calculated value def1.

Figure 6A:
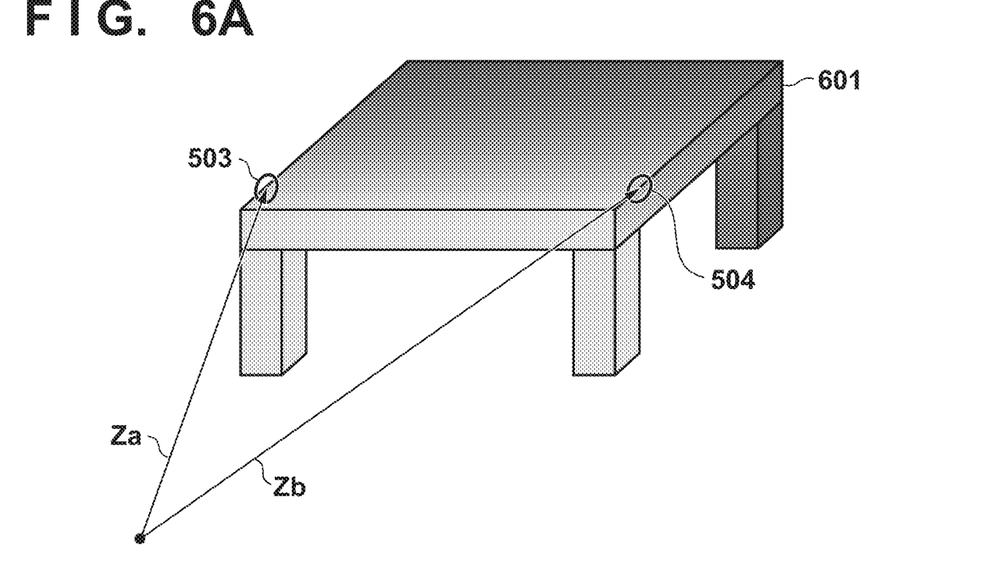
FIG. 6A is an explanatory diagram of distance data.

The image 601 in FIG. 6A illustrates an example of distance data obtained as a result of calculating the aforementioned distance value. In the image 601, it is indicated that the brighter the region is, the closer the distance to the electronic apparatus 100 (image capture unit 102), and the darker the region is, the farther the distance from the electronic apparatus 100 (image capture unit 102). Note that, as illustrated in FIG. 6A, the distances (subject distances) from the front principal point position of the optical system 101 to two measurement points 503 and 504 specified by the user are denoted by za and zb, respectively. Note that the black line representing the contour part in the image 601 is intended for clarity of illustration and does not reflect the measured distance.

Returning to FIG. 4, the determination unit 311 determines at step S403 whether or not the difference between the subject distances za and zb of the two measurement points 503 and 504 calculated at step S402 is equal to or smaller than a predetermined value. For example, the aforementioned comparison is performed using a value that is 5% of the smaller one of the subject distances za and zb, i.e., the subject distance from the closer measurement point to the electronic apparatus 100, as the predetermined value. When the difference between Za and Zb is determined to be equal to or smaller than the predetermined value, the process flow proceeds to step S405, otherwise the process flow proceeds to step S404. At step S404, the control unit 103 displays, on the display unit 107, a message prompting the user to capture an image from the front of the two measurement points. Subsequently, the control unit 103 waits until another measurement point is specified at step S401.

As to projection of the actual-size scale image described below, projection with the correct actual size is prevented when a line segment connecting two specified measurement points is not orthogonal but substantially tilted relative to the electronic apparatus 100. The determination at step S403 and the processing at step S404 described above are intended to avoid such an inconvenience. Note that the predetermined value (threshold value) used at step S403 is not limited to that described above and therefore it is conceivable to perform measurement with a higher accuracy by using a smaller value, for example.

When it is determined at step S403 that the difference between the subject distances Za and Zb is equal to or smaller than the predetermined value, the distance calculation unit 304 measures the length between the two measurement points specified at step S401. First, the distance (number of pixels) pc between the two points on the captured image is calculated. Letting (xa, ya) and (xb, yb) be the coordinates of the two points on the image, pc is calculated by the following equation (3).

$$pc=((xb-xa)^2+(yb-ya)^2)^{1/2} \quad (3)$$

Furthermore, the distance calculation unit 304 calculates, as the distance to the subject, the average value z (=(Za+Zb)/2) of the distances Za and Zb, calculated at step S402, from the front principal point position of the optical system 101 to the two measurement points on the object. Letting f be the distance from the rear main point position of the optical system 101 to the image capture element (pixel 202), and pp be the pixel pitch of the image capture element (pixel 202), the length (actual distance) S between the two points can be calculated by the following equation.

$$S=pc \times pp \times z/f \quad (4)$$

Note that calculation of the length between two points on the image is not limited to the technique using equation (4) described above. Other information may be determined using any information provided that the number of pixels between two points and the distance information of the subject are used.

Figure 6B:
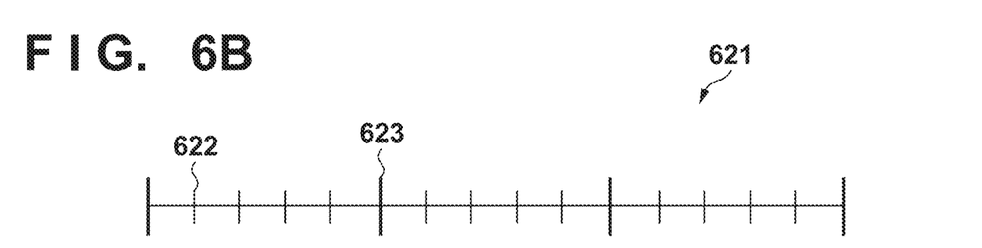
FIG. 6B illustrates an example of a scale image.

At step S406, the projection control unit 12 calculates the scaling factor when the projection unit 108 projects an image or a light beam onto the subject. Here, a case is described where the projection unit 108 projects a scale shape that allows for measurement of the actual size length by eyesight. FIG. 6B illustrates a scale shape to be projected according to the present embodiment. A scale shape 621, which depicts an image to be actually projected by the projection unit 108, is a ruler-like shape having tick marks. In the present embodiment, the smaller tick mark 622 of the scale shape 621 represents 20 cm in actual size, and the larger tick mark 623 represents 100 cm in actual size.

The projection control unit 12 determines, based on the subject distance of the measurement point calculated at step S402, the scaling factor for enlarging or reducing the projection so that the interval of tick marks turns out to be the actual size when the projection unit 108 projects the scale shape 621 onto the projection surface. In other words, the projection control unit 12 adjusts the size (scaling factor) of the scale shape 621 so that the length between adjacent tick marks 622 actually turns out to be 20 cm on the projection surface located at the measured subject distance. Note that the length represented by the tick marks is not limited to the examples described above. In addition, a user may be allowed to set the interval between the tick marks 622, the interval between the tick marks 623, or the like, to be a suitable numerical value for the subject to be measured.

Figure 6C:
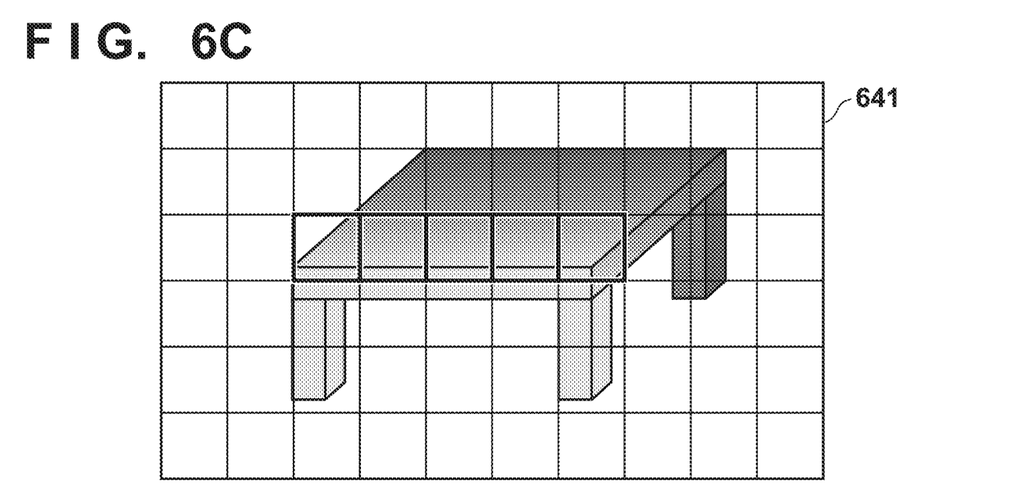
FIG. 6C is an explanatory diagram of a block integration method.

Next, at step S407, the feature extraction unit 303 extracts the feature amount of the subject 501 from the image 502. Specifically, the feature extraction unit 303 divides the image 502 into unit blocks, and calculates an integral value of brightness and hue at two points specified at step S401 and blocks existing between the two points. FIG. 6C, which is a schematic diagram illustrating the division, illustrates an image 641 resulted from dividing the image 502 into a plurality of blocks. In addition, the blocks indicated by bold lines, among the plurality of blocks, are blocks to be subjected to calculation of integral values (blocks including the two measurement points specified at step S401 and a line segment connecting them). The feature extraction unit 303 calculates integral values of hue in target blocks, and extracts the average value of the integral values as the feature amount of the subject 501. Treating the hue obtained by the aforementioned process as the hue (color of the surface of the subject 501) of the region to which the scale shape 621 is to be projected allows for appropriately determination of the color of the scale shape to be projected.

At step S408, the projection control unit 12 determines the color of the image of the scale shape 621 to be projected by the projection unit 108, based on the feature amount extracted by the feature extraction unit 303 at step S407. For example, it is possible to make the tick markers easier to be viewed by selecting the complementary color of the hue indicated by the average value of the hues calculated as described above as the color of the image to be projected. In addition, a preliminarily set initial value such as green can be used when the calculated hue is achromatic. In addition, the projection control unit 12 may control such that the higher the brightness of the subject is, the more the brightness of the image is reduced. For example, the projection control unit 12 may perform control to raise the brightness of the image when the brightness of the subject is lower than a predetermined value, and reduce the brightness of the image when the brightness of the subject is equal to or larger than a predetermined value. For example, integral values of brightness are calculated for the target blocks described above and, when their average value is larger than a predetermined value, the scale shape 621 is projected with a reduced brightness of projection by the projection unit 108. Accordingly, ease of viewing by eyesight is improved by projecting a low-brightness image when the brightness of the subject on which an image of a scale shape is projected is higher than a predetermined value, and projecting a high-brightness image when the brightness is equal to or lower than the predetermined value.

At step S409, the projection control unit 12 determines whether or not the distance (subject distance) to the measurement point calculated at step S402 is equal to or larger than a predetermined distance. Specifically, the projection control unit 12 compares the larger value of the subject distances of two points (Za and Zb), i.e., the subject distance of the farther measurement point, with a preliminarily set threshold value (e.g., 10 meters). When the subject distance is larger, the process flow proceeds to step S410, otherwise the process flow proceeds to step S411.

The farther the subject to be measured is located, the deeper the depth of the scale shape 621 and the smaller the defocus amount becomes, which results in insufficient resolution of actual distance and reduced reliability. Accordingly, at step S410, the projection control unit 12 changes the display form of the scale shape 621 in order to notify the user thereabout. For example, the projection unit 108 changes the projection color of the scale shape 621 to red. Accordingly, the user can view the projection color by eyesight to recognize that the measured value has a low reliability, and take measures such as adjusting the photographing distance. Note that the manner of changing the display form is not limited to that described above and, for example, the display color may be changed to orange when the color of the subject is red, or the scale shape 621 may be projected in a flashing manner without changing its color.

At step S411, the projection control unit 12 controls the projection unit 108 to project the scale shape 621 onto the subject in accordance with the set scaling factor and color. The projection control unit 12 controls the projection unit 108 to project a scale with a length corresponding to the distance between the two specified measurement points on a line connecting the two measurement points, in a manner conforming along the line.

Figure 7:
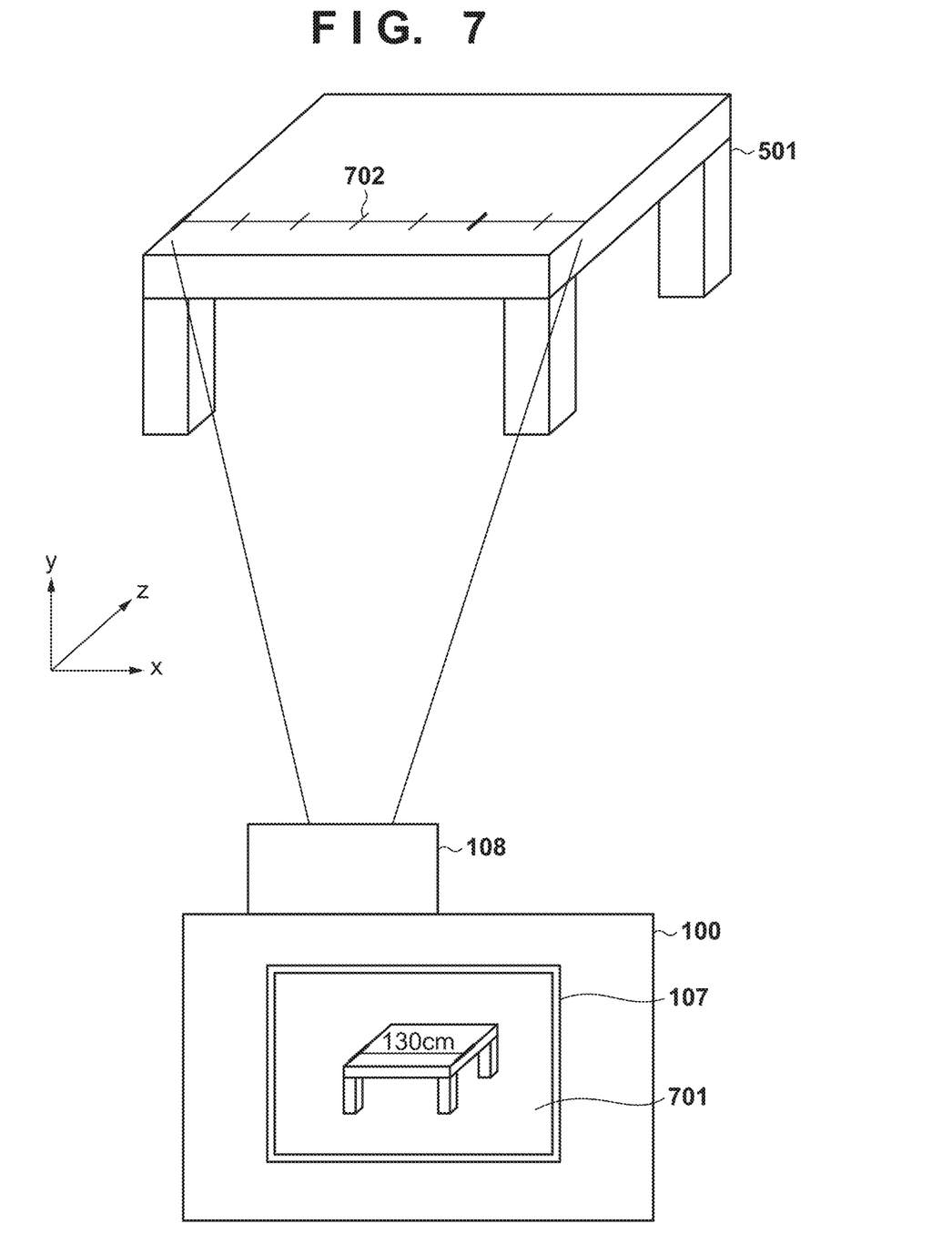
FIG. 7 illustrates a state in which a scale image is projected onto a subject.

FIG. 7 illustrates a projection state of the scale shape. As illustrated in FIG. 7, the control unit 103 displays the measurement result of the length (130 cm in the present example) between the two specified measurement points in a manner superimposed on the image 701 in the display unit 107. In addition, a scale image 702 corresponding to the scale shape 621 is projected onto the subject 501 from the projection unit 108, which the user can view by eyesight. Accordingly, a user who is not watching the display unit 107 may also confirm that the length between the two measurement points is about 130 cm.

Note that, although the length of the scale image 702 to be projected is equivalent to the actual size length between the specified measurement points in the embodiment described above, the length is not limited thereto. For example, there may be a configuration that projects a length equivalent to the length of the image to be projected, which may be arbitrarily set by the user. According to such a configuration, a user can provide a setting to project an image equivalent to one meter in a case, for example, where the user wants to confirm by eyesight a range spanning one meter on the subject.

According to the first embodiment, as has been described above, an image (scale image) of a length equivalent to the actual size length is projected in accordance with the distance to, or the shape of the subject. Accordingly, a person (user who cannot view the image displayed on the display unit 107) other than the photographer can also grasp the length of the subject.

Note that, although a case has been described in the present embodiment where a ruler-like image (scale image 702) is projected, the shape to be projected is not limited thereto. The projection unit 108 may be a projector having a liquid crystal section, or may be configured to perform drawing on an object using laser such as a laser pointer or a line laser. For example, the projection unit 108 may be configured to project two or more light spots or linear light beams. For example, the projection unit 108 may have two light-projecting units and may be configured to control the two light-projecting units so as to project, onto the subject, two light beams spaced apart by an interval equivalent to a length (e.g., 1 meter) which has been arbitrarily set by the user. According to such a configuration, the projection unit 108 can be more simply configured than that required for scaling and projecting images. In addition, linearly projecting images or light beams of an arbitrary length allows for confirmation by eyesight how subjects are arranged, such as whether the subjects are arranged along a straight line or spaced apart by a predetermined interval.

Additionally, in the present embodiment, the projection form by the projection unit 108 has been changed (the color has been changed in this example), in order to indicate that the reliability of measurement is low in a case where the distance to the subject is far. However, determination of the reliability of measurement is not limited to that based on the distance to the subject and, for example, the display form may be changed by determining the reliability based on the edge amount of the subject. When calculating the distance value by the distance calculation unit 304 at step S402, it becomes difficult to calculate the correlation value by stereo matching in a region where texture of the subject is insufficient. In a case where the edge amount of the subject is smaller than a predetermined amount, the projection control unit 12 controls the projection unit 108 not to project the image, or to project the image with a different projection form from that in the case where the edge amount of the subject is equal to or larger than a predetermined amount. For example, in a case where the block integral value of the edge of the subject detected by the feature extraction unit 303 is smaller than a predetermined amount, the projection control unit 12 controls the projection unit 108 not to project the image, or to project the image with a different color from the usual color. Note that the block integral value of the edge is, for example, the integral value of the amount of the subject in the block indicated by bold lines in FIG. 6C. Such a control allows the user to grasp that the reliability of measurement is low, and adjust the positions and points of measurement.

In addition, although the present embodiment has described, as the configuration of the distance measurement unit 11 for obtaining distance information, a configuration that generates an image based on the phase difference between a plurality of subject images generated by light fluxes arriving from different regions of the pupil of the image capture optical system such as that illustrated in FIGS. 2A and 2B, other configurations may be used as replacements or in conjunction. For example, it is also conceivable to use a configuration of a stereoscopic camera having a plurality of lenses and image capture elements as the distance measurement unit 11 to facilitate detection of image shift amount with a higher accuracy. In addition, the distance measurement unit 11 may be configured to measure the distance to the object 20 using light or sound. For example, a configuration that measures the distance using a Time Of Flight (TOF) camera or ultrasonic waves can improve the performance of measuring distance to a subject with little pattern variation.

Second Embodiment

Figure 8:
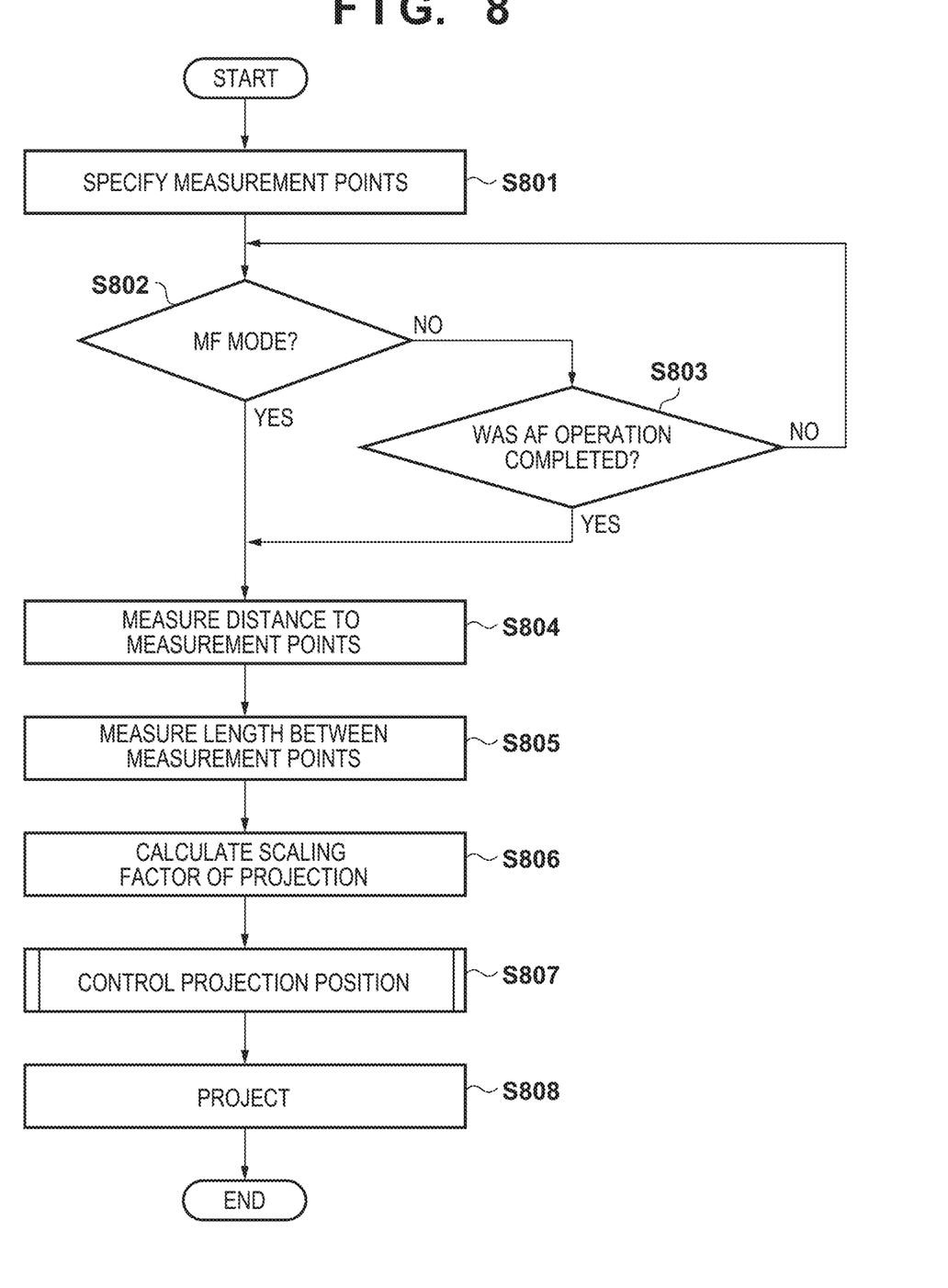
FIG. 8 is a flowchart illustrating an operation of the electronic apparatus of a second embodiment.

In the first embodiment, an example has been described in which the scale image is projected onto a position connecting specified measurement points. In a case where the surface of the subject between the specified measurement points is not suitable for projection of the image (e.g., an irregularity-rich case), the projected image turns out difficult to be viewed. In a second embodiment, the position or timing of projection is controlled to facilitate the user to view the projected image by eyesight. FIG. 8 is a flowchart illustrating an operation of the electronic apparatus of the second embodiment. In the second embodiment, the timing of projecting the image is suitably controlled at steps S802 to S803, and the position at which the image is projected is suitably controlled at step S807.

At step S801, the control unit 103 receives two points specified by the user on the display unit 107 as measurement points. The processing at step S801 is similar to that at step S401. At step S802, the image capture information obtaining unit 302 determines whether the focus mode of the electronic apparatus 100 is in a manual focus (MF) mode in which the focus is manually set, or an auto focus (AF) mode in which the focus is automatically set. When it is determined to be in the MF mode, the process flow proceeds to step S804, or the process flow proceeds to step S803 when it is determined to be in the AF mode.

At step S803, the projection control unit 12 determines whether or not the AF button has been depressed by the user and the focusing operation has been completed. When it is determined that the focusing operation has been completed, the process flow proceeds to step S804, or the process flow returns to step S802 when it is determined to be before, or in the course of, focusing.

Here, the purpose of controlling the mode of focus and the focusing operation state will be described. In the AF mode, it is conceivable that the correct value of the distance to the subject cannot be calculated or the value is unstable. When the projection unit 108 projects an image or a light beam in such a state, it becomes difficult for the projection unit 108 to perform correct measurement or visual recognition. Accordingly, projection for measurement is performed after completion of the AF focusing operation or in the MF mode in which the focus does not automatically change, whereas projection for measurement is not performed during focusing operation in the AF mode.

As described above, with the timing of performing distance measurement and projection being controlled, the process flow proceeds to step S804. At step S804, the distance calculation unit 304 calculates the distance from the image capture unit 102 to the measurement points (the two points specified by the user) received at step S801. As described in the first embodiment, the distance calculation unit 304 obtains distance data as illustrated in FIG. 6A, and obtains the distances Za and Zb to the measurement points.

At step S805, the distance between measurement points received at step S801 is measured. The method for calculating the distance between two points is similar to that of the first embodiment (step S405). At step S806, the projection control unit 12 calculates a scaling factor when projecting an image or a light beam onto a subject. The method for calculating the scaling factor is similar to that of the first embodiment (step S406). At step S807, the projection control unit 12 performs a process of determining a position at which an image is projected onto the subject. In the present embodiment, the projection control unit 12 obtains the degree of change of distance measured by the distance calculation unit 304 for a plurality of regions in which an image can be projected onto the subject, and controls the projection unit 108 to project the image onto a region of which the degree of change is smaller than a predetermined value. Details of the process of determining such a projection position will be described referring to the flowchart of FIG. 9.

At step S901, the distance calculation unit 304 calculates the block integral of distance values using the distance data (FIG. 6A) generated at step S804. FIGS. 10A to 10D are schematic diagrams illustrating how the block integral of distance values is calculated. The image in FIG. 10A indicates a state in which the image obtained by the image capture unit 102 (including the image 601 of the distance data) is divided into a plurality of blocks. The block group 1010 indicated by bold lines is a group of calculation target blocks located between measurement points received at step S801. The image illustrated in FIG. 10B indicates the result of block integral calculation of the image illustrated in FIG. 10A. For each block, an integral value of distance data (integral value) is calculated.

Figure 9:
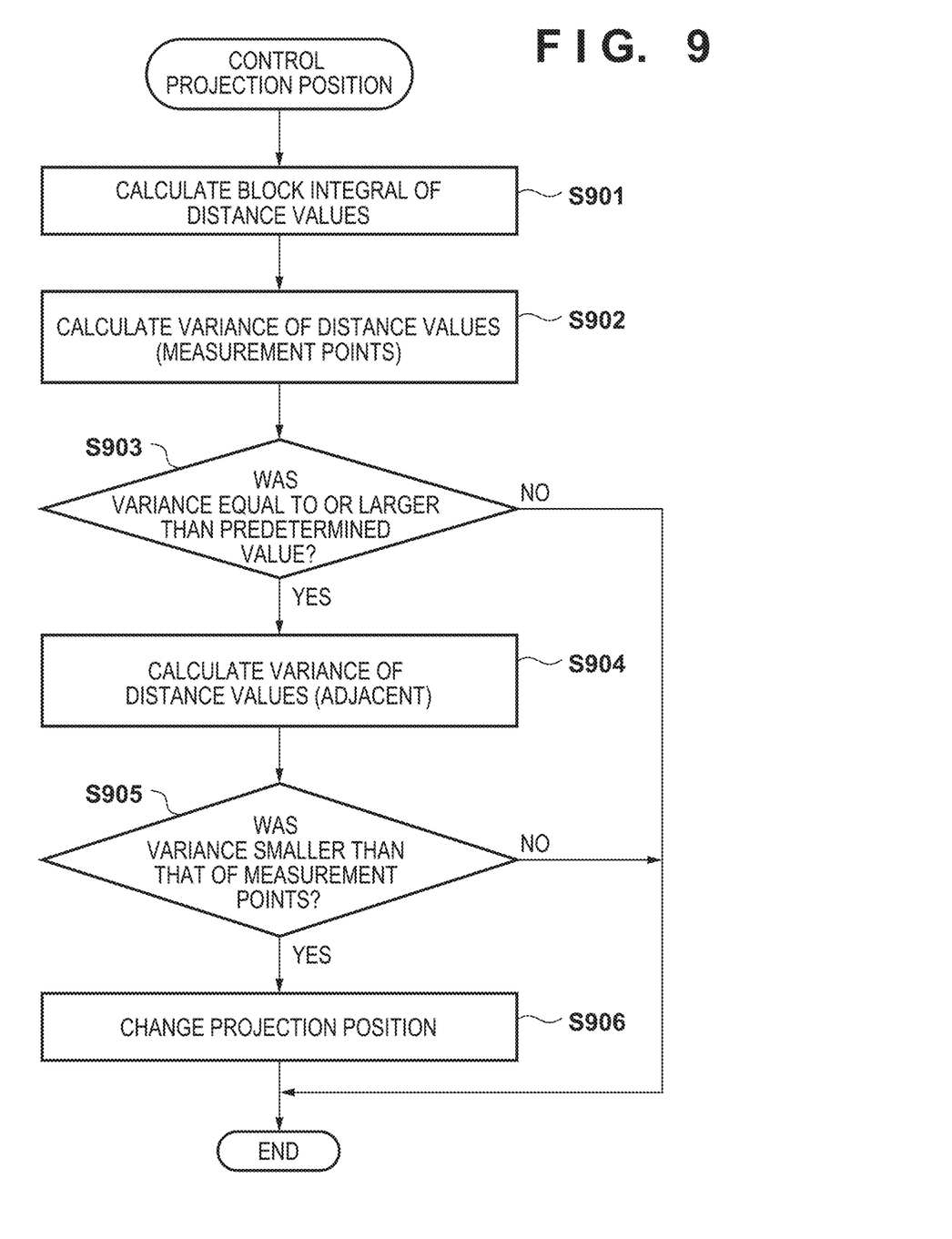
FIG. 9 is a flowchart illustrating control of a projection position according to the second embodiment.

At step S902, the distance calculation unit 304 uses the integral values calculated at step S901 to calculate a variance value of the integral values of individual blocks included in the group of calculation target blocks located between the measurement points received at step S801. At step S903, the projection control unit 12 determines whether or not the variance value calculated at step S902 is equal to or larger than a predetermined value. The purpose is to determine whether the surface of the subject between measurement points that turns out to be the projection surface on which the scale image is to be projected is flat in terms of distance, or irregularity-rich. Note that a value obtained by other methods such as difference between maximum and minimum values of an integral value may be used as the evaluation value, without being limited to variance of distance value. When it is determined at step S903 that the variance value is not equal to or larger than a predetermined value, the process of setting the projection position is terminated. In such a case, the projection position lies between the two specified measurement points.

Figure 10A:
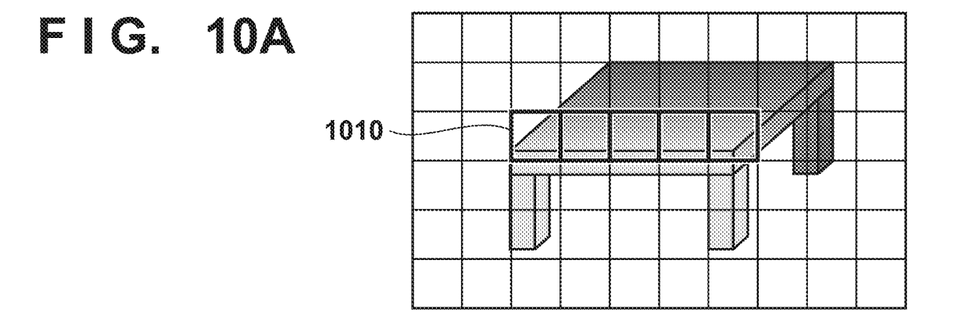
FIGS. 10A to 10D are explanatory diagrams of a block integration method according to the second embodiment.
Figure 10B:
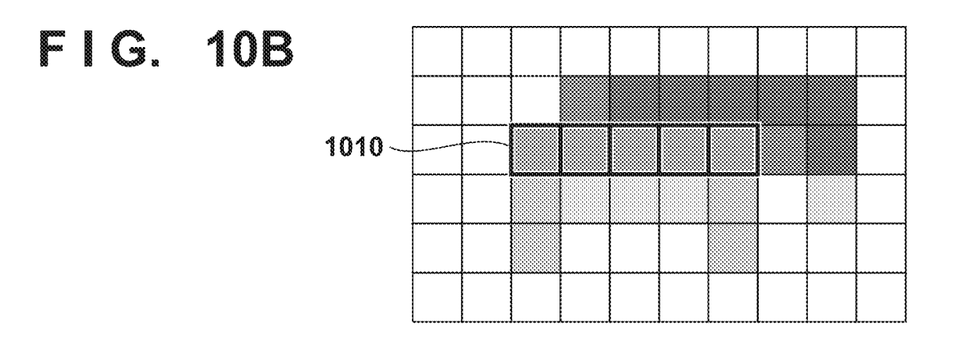
Figure 10C:
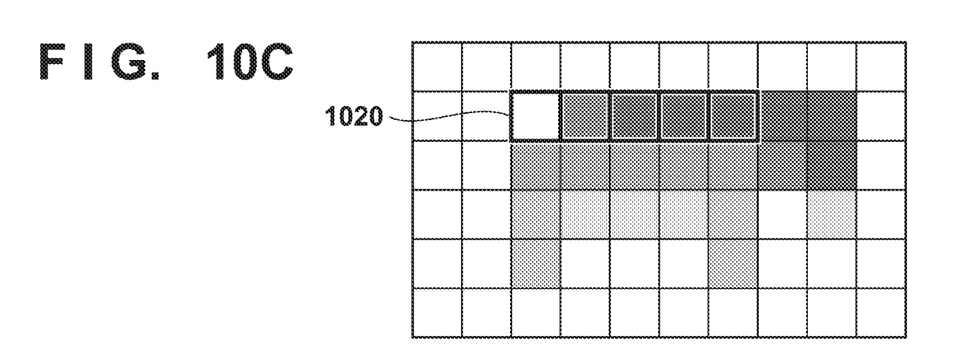
Figure 10D:
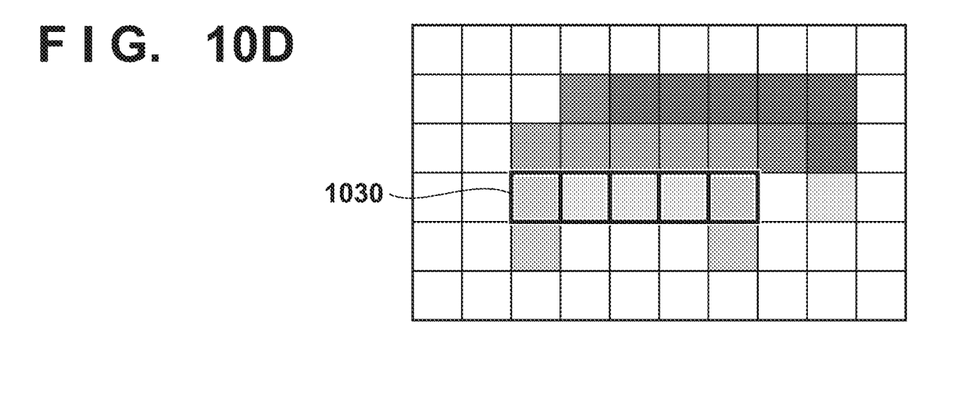

When, on the other hand, it is determined at step S903 that the variance value is equal to or larger than a predetermined value, the process flow proceeds to step S904. At step S904, calculation of variance of distance values performed by the distance calculation unit 304 on the group of calculation target blocks (block group 1010) at steps S901 to S902 is performed on a group of blocks adjacent to the group of calculation target blocks. Specifically, variance of distance values is calculated for a block group 1020 and a block group 1030 indicated by bold lines in FIGS. 10C and 10D. Note that the block group 1020 is a group of blocks adjacent to the group of calculation target blocks in the upward direction. In addition, the block group 1030 is a group of blocks adjacent to the group of calculation target blocks in the downward direction.

At step S905, the projection control unit 12 determines whether or not the variance value of the group of adjacent blocks calculated at step S904 is smaller than the variance value of the group of calculation target blocks calculated at step S902. When the variance value of the group of adjacent blocks is equal to or larger than the variance value of the group of calculation target blocks, the process of setting the projection position is terminated.

When, at step S905, the variance value of the group of adjacent blocks is smaller than the variance value of the group of calculation target blocks, the process flow proceeds to step S906. At step S906, the projection control unit 12 changes the position at which the projection unit 108 projects the image onto the subject. The initial position at which the image is projected is between the two measurement points specified at step S801. However, it is conceivable that projection of the image may make tick markers for measuring length difficult to be viewed by eyesight, when it is determined at step S903 that the variance of defocus between the two points is equal to or larger than a predetermined value, i.e., irregularity-rich in terms of distance. Accordingly, it is possible to improve the visibility by projecting onto an adjacent region with a smaller variance of distance values, i.e., being flat in terms of distance. Note that, when it is determined at step S905 that variance values of two groups of adjacent blocks are both small, the position may be changed to that with the smaller variance, or may be arbitrarily selected by the user. In a case where no improvement is expected by moving the projection position (NO at step S905), the initial position is used as the projection position of the image by the projection unit 108.

Returning to FIG. 8, the scale image 702 is projected at step S808 onto the subject 501, based on the scaling factor set at step S806 and the projected position controlled at step S807. Note that, similarly to the first embodiment, the projection control unit 12 may control the projection color of the projection unit 108.

As described above, according to the second embodiment, an image of the actual size length is projected while controlling the timing and the projection position so as to facilitate the user to view, by eyesight, an image or light beam projected onto an image-captured subject. Accordingly, it is possible to stably project an image with the actual size length onto the subject at a position in which the image is easily visible.

Note that, although the second embodiment controls whether or not to perform projection in accordance with the mode of focus or the operating state, it is also conceivable to control the projection form (color, or the like). For example, projection of the image may be performed using red during the focusing operation in the AF mode, or green after completion of the focusing operation and during the MF mode. The user, viewing the projection form of the image, may determine whether or not it is measurable (whether or not there is problem with the measurement accuracy).

In addition, although a configuration has been described in the second embodiment that detects the flat part in terms of distance to determine the projection position of the image, the image may be projected on an in-focus part. The user can grasp that there is nothing in focus when an image is not projected onto anything. It also becomes possible to move the subject to a position onto which the image is projected (i.e., being in focus).

In addition, the projection control unit 12 may be configured to determine whether or not to cause the projection unit 108 to project an image, depending on whether or not the brightness of the environment subjected to photometry is smaller than a predetermined value, as a result of performing photometry of the brightness of the environment. For example, the projection control unit 12 refers to the exposure amount calculated by the control unit 103 when performing image capture, and constantly causes the projection unit 108 to perform projection for a low illumination intensity environment where the brightness is lower than a predetermined level. With such a control, it is possible to increase the contrast of the subject in a low intensity environment, whereby an improved focus accuracy is expected.

Although preferred embodiments of the present invention have been described above, the present invention is not limited to such embodiments, and various modifications and changes can be made within the scope of the gist. For example, a part or all of the image processing described in the embodiments may be performed on a device (such as a computer) external to the device (such as a camera) used for image capture.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-093132, filed May 16, 2019, which is hereby incorporated by reference herein in its entirety.

What is claimed is:

1. An electronic apparatus, comprising:
at least one memory storing a program; and
one or more processors which, by executing the program, causes the electronic apparatus to perform:
obtaining a first distance to a first point on an object and a second distance to a second point on the object; and
controlling, based on the first distance and the second distance, projection of a predetermined image by a projector so that the predetermined image projected onto the object has a predetermined actual-size length.

2. The apparatus according to claim 1, wherein the predetermined image projected onto the object has a line segment or a predetermined shape.

3. The apparatus according to claim 2, wherein the one or more processors, by executing the program, further causes the electronic apparatus to perform accepting an actual-size length of the line segment or shape designated by a user.

4. The apparatus according to claim 1, wherein in the obtaining, the first distance and the second distance are calculated based on an optical or audio signal emitted toward the object.

5. The apparatus according to claim 1, further comprising the projector.

6. The apparatus according to claim 1, wherein the first point and the second point on the object are determined based on a position specified by a user on a captured image of the object displayed on a display.

7. The apparatus according to claim 6, further comprising the display.

8. The apparatus according to claim 6, further comprising an imaging device configured to capture an image of the object to obtain the captured image.

9. The apparatus according to claim 1, wherein in the controlling, the projector is controlled to project the predetermined image between the first point and the second point.

10. The apparatus according to claim 1, wherein the first position and the second position are specified by a user, and if the difference between the first distance and the second distance is not smaller than a predetermined value, a notification is informed to the user.

11. The apparatus according to claim 1, further comprising an imaging device configured to capture an image of the object, wherein
in the obtaining, the first distance and the second distance are calculated based on an output from the imaging device.

12. The apparatus according to claim 11, wherein in the controlling, projection form of the predetermined image by the projector is controlled based on at least one of brightness, color, and edge amount of the image of the object.

13. The apparatus according to claim 12, wherein in the controlling, the projection form is controlled such that the higher the brightness of the image of the object is, the more the brightness of the predetermined image is reduced.

14. The apparatus according to claim 12, wherein in the controlling, the predetermined image is projected with a color having a difference equal to or larger than a predetermined degree from the color of the image of the object.

15. The apparatus according to claim 12, wherein in the controlling, in a case where an edge amount of the image of the object is smaller than a predetermined amount, the projection is controlled not to project the predetermined image, or to project the predetermined image in a different projection form from the case where the edge amount of the image of the object is equal to or larger than the predetermined amount.

16. The apparatus according to claim 11, wherein in the controlling, it is controlled whether or not to perform projection of an image by the projector based on at least one of brightness, color, and edge amount of the image of the object.

17. The apparatus according to claim 1, wherein in the controlling, in a case where a greater one of the first distance and the second distance is larger than a predetermined value, the projection is controlled not to project the predetermined image, or to project the predetermined image in a different projection form from the case where a greater one of the first distance and the second distance is equal to or smaller than the predetermined value.

18. The apparatus according to claim 1, wherein in the controlling, a degree of change of distances obtained for a plurality of regions of the object onto which the predetermined image can be projected, and the predetermined image is projected onto a region of which the degree of change is smaller than a predetermined value.

19. The apparatus according to claim 1, wherein the one or more processors, by executing the program, further causes the electronic apparatus to perform automatically adjusting focus of an imaging device, wherein
in the controlling, in a case where the focusing operation has not been completed, the projection of the predetermined image is controlled not to project the predetermined image, or to project the predetermined image in a different form from the case where the focusing operation has been completed.

20. The apparatus according to claim 19, wherein in the controlling, the projection is controlled to project the predetermined image while a mode in which a user manually adjusts focus is being selected.

21. The apparatus according to claim 1, wherein the one or more processors, by executing the program, further causes the electronic apparatus to obtain brightness of environment, wherein
in the controlling, it is determined whether or not to project the predetermined image in accordance with whether or not the obtained brightness of the environment is smaller than a predetermined value.

22. The apparatus according to claim 1, wherein the one or more processors, by executing the program, further causes the electronic apparatus to perform generating the predetermined image for which the actual-size length is set based on an actual distance between the first point and the second point calculated based on the first distance and the second distance.

23. A method of controlling an electronic apparatus, the method comprising:
obtaining a first distance to a first point on an object and a second distance to a second point on the object; and
controlling projection of a predetermined image by a projector so that the predetermined image projected onto the object has an actual-size length, based on the first distance and the second distance.

24. A non-transitory computer-readable storage medium storing a program that causes a computer of an electronic apparatus to perform a control method comprising:
obtaining a first distance to a first point on an object and a second distance to a second point on the object; and
controlling projection of a predetermined image by a projector so that the predetermined image projected onto the object has an actual-size length, based on the first distance and the second distance.

* * * * *